US009143673B2

(12) United States Patent  (10) Patent No.: US 9,143,673 B2
Miao  (45) Date of Patent: Sep. 22, 2015

(54) IMAGING DEVICE WITH A PLURALITY OF PIXEL ARRAYS

(71) Applicant: Google Inc., Mountain View, CA (US)

(72) Inventor: Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/622,654

(22) Filed: Sep. 19, 2012

(65) Prior Publication Data

US 2014/0078333 A1  Mar. 20, 2014

(51) Int. Cl.
*H04N 5/232* (2006.01)
*H04N 5/235* (2006.01)

(52) U.S. Cl.
CPC ......... *H04N 5/23212* (2013.01); *H04N 5/2355* (2013.01); *H04N 5/23232* (2013.01)

(58) Field of Classification Search
CPC ........... G06T 2207/20212; G06T 2207/20208; G06T 2207/20172; G06T 2207/20216; G06T 2207/20221; G06T 5/50; H04N 1/3871; H04N 1/407; H04N 5/23232; H04N 5/2355; H04N 5/355; H04N 5/235; H04N 5/35536; H04N 5/35545; H04N 5/35581; H04N 2209/045; H04N 2209/046; H04N 9/67; H04N 9/76
USPC ........ 348/218.1, 224.1, 241, 229.1, 268–324, 348/360
See application file for complete search history.

(56) References Cited

U.S. PATENT DOCUMENTS

| 7,417,674 | B2* | 8/2008 | Gruhlke | 348/240.3 |
|---|---|---|---|---|
| 8,542,288 | B2* | 9/2013 | Waqas et al. | 348/218.1 |
| 8,928,793 | B2* | 1/2015 | McMahon | 348/315 |
| 9,025,038 | B2* | 5/2015 | Tsutsumi | 348/208.4 |
| 2002/0176605 | A1 | 11/2002 | Stafsudd et al. | |
| 2005/0117017 | A1 | 6/2005 | Baer | |
| 2005/0174470 | A1* | 8/2005 | Yamasaki | 348/345 |
| 2007/0257184 | A1* | 11/2007 | Olsen et al. | 250/208.1 |
| 2008/0149812 | A1 | 6/2008 | Ward et al. | |
| 2008/0303919 | A1* | 12/2008 | Egawa | 348/223.1 |
| 2009/0309990 | A1* | 12/2009 | Levoy et al. | 348/222.1 |
| 2010/0110368 | A1* | 5/2010 | Chaum | 351/158 |
| 2010/0208101 | A1 | 8/2010 | Pertsel et al. | |
| 2010/0309340 | A1 | 12/2010 | Border et al. | |
| 2011/0176020 | A1* | 7/2011 | Chang | 348/222.1 |
| 2013/0027575 | A1* | 1/2013 | Cho et al. | 348/222.1 |
| 2013/0242057 | A1* | 9/2013 | Hong et al. | 348/47 |

OTHER PUBLICATIONS

PCT Application No. PCT/US2013/060469—International Search Report & Written Opinion, mailed Dec. 9, 2013, 9 pages.

* cited by examiner

*Primary Examiner* — Pritham Prabhakher
(74) *Attorney, Agent, or Firm* — Blakely Sokoloff Taylor & Zafman LLP

(57) ABSTRACT

An imaging device includes a first pixel array arrange to capture a first image and a second pixel array arranged to capture a second image. The first pixel array and the second pixel array face substantially a same direction. The imaging device also includes shutter control circuitry which is coupled to the first pixel array to initiate a first exposure period of the first pixel array to capture the first image. The shutter control circuitry is also coupled to the second pixel array to initiate a second exposure period of the second pixel array to capture the second image. The imaging device also includes processing logic coupled to receive first pixel data of the first image and coupled to receive second pixel data of the second image. The processing logic is configured to generate at least one image using the first pixel data and the second pixel data.

9 Claims, 15 Drawing Sheets

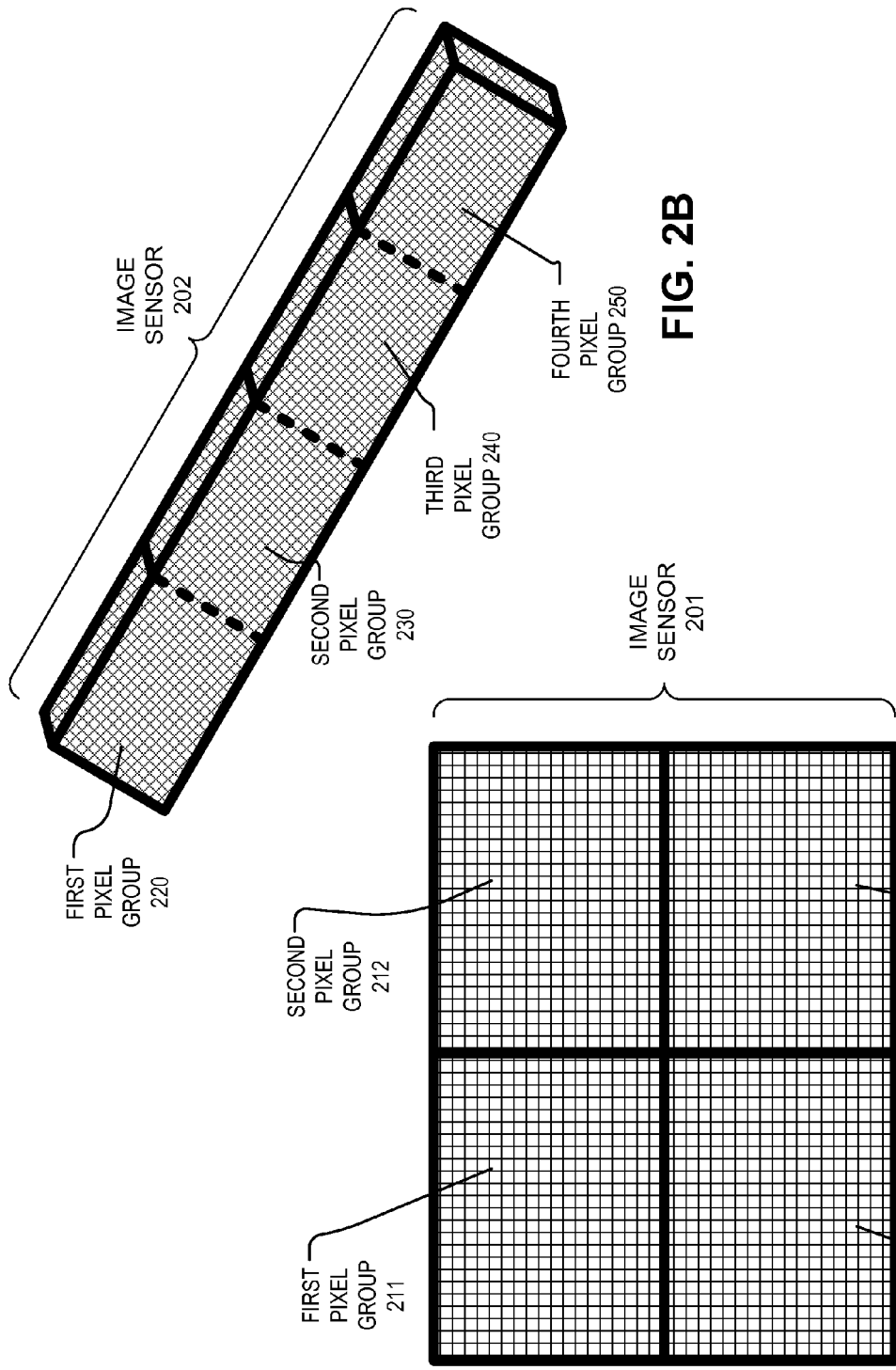

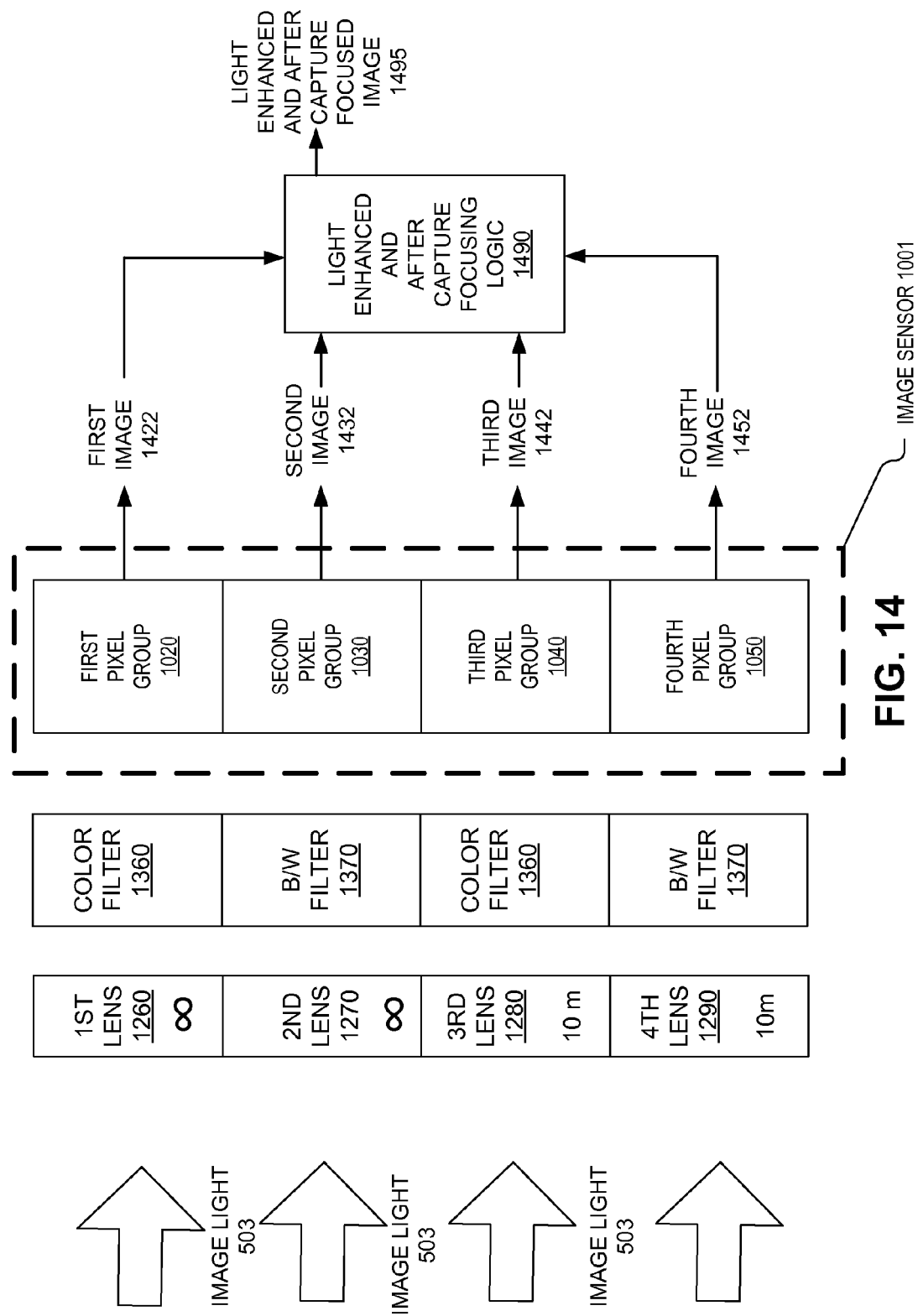

IMAGING DEVICE WITH A PLURALITY OF PIXEL ARRAYS

TECHNICAL FIELD

This disclosure relates generally to optics, and in particular but not exclusively, relates to digital imaging devices.

BACKGROUND INFORMATION

Conventional digital imaging devices or cameras have a lens (which may include multiple lens elements) that focuses image light onto an image sensor that measures the image light and generates an image based on the measurements. FIG. 1 illustrates a common configuration for a digital imaging device 100. FIG. 1 includes an image sensor 101 and optical efficiency lenses 110 disposed over image sensor 101. Optical efficiency lenses 110 function to draw as much light as possible into the pixels for measurement. Optical efficiency lenses 110 may be microlenses disposed over each pixel of image sensor 101. An infrared ("IR") filter 115 may be disposed over optical efficiency lenses 110 and image sensor 101 to filter out IR light from being measured by image sensor 101. Lens 120 is disposed over image sensor 101 to focus image light 190 onto the pixels of image sensor 101. Lens 120 may include convex and/or concave lens elements 123 that give lens 120 a certain focal length. The focal length of lens 120 may correspond with a Depth of Field. Depth of Field refers to the range of distances in the field of view of an image sensor that appear to be well focused in an image captured by image sensor 101.

To achieve a given resolution, a conventional digital imaging device may require a certain footprint in a given aspect ratio (e.g. 4:3, 16:9). Conventional digital imaging devices may also have a limited field of view for a given image capture. Conventional digital imaging devices may also be limited to a given number of image captures in a specific amount of time (e.g. 30 frames per second). Some conventional digital imaging devices are also limited to a given exposure time in a given image capture. This may limit the dynamic range of the image captured. A conventional digital imaging device also typically only has one depth of field in any given image captured because lens 120 has one focus distance at one time. For example, the foreground of an image may be in focus because it is within the depth of field for that image, but the background of the image may be blurred because it was not within the depth of field for that image. Therefore, a device or method that allows a digital imaging device to overcome all or some of these limitations would be advantageous.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 2A and 2B show example image sensors that include different pixel groups, in accordance with an embodiment of the disclosure.

FIG. 14 shows an example block diagram that illustrates different pixel groups of an image sensor receiving image light through lenses and filters and generating a light enhanced after capture focused image, in accordance with an embodiment of the disclosure.

DETAILED DESCRIPTION

Figure 1:
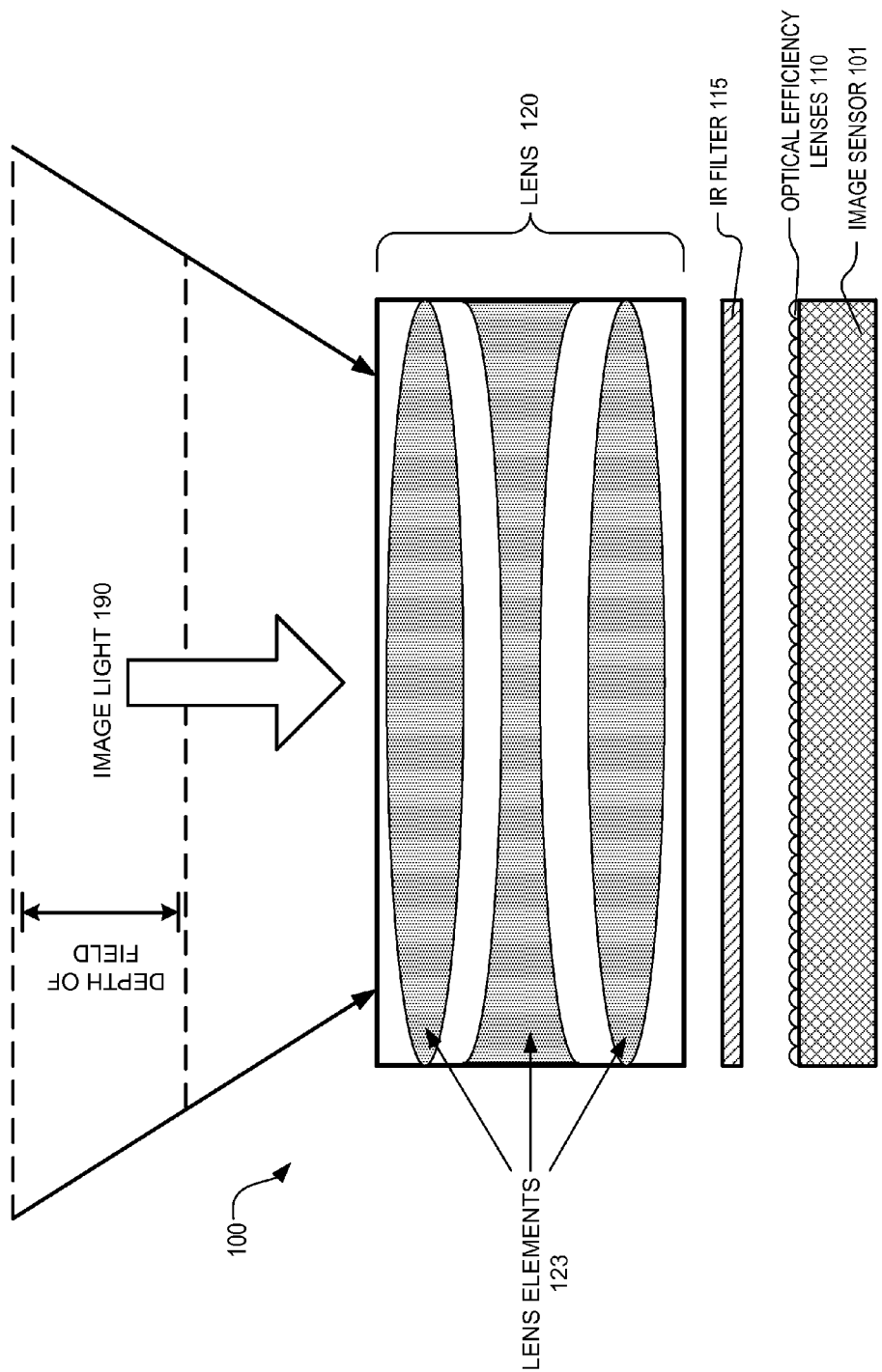
FIG. 1 is a side view of a conventional digital imaging device that includes a lens focusing image light onto an image sensor.

Embodiments of a system and method for capturing images are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 2A and 2B show example image sensors that include different pixel groups (or arrays), in accordance with an embodiment of the disclosure. Image sensor 201 includes first pixel group 211, second pixel group 212, third pixel group 213, and fourth pixel group 214. In the illustrated embodiment, image sensor 201 is substantially rectangle shaped and is quartered into four sections and a pixel group occupies each of the four sections. In the illustrated embodiment, each pixel group is facing substantially the same direction. First pixel group 211, second pixel group 212, third pixel group 213, and fourth pixel group 214 may all be disposed on the same semiconductor die.

Image sensor 202 includes first pixel group 220, second pixel group 230, third pixel group 240, and fourth pixel group 250. In the illustrated embodiment, each pixel group is facing substantially the same direction. In the illustrated embodiment, image sensor 202 is substantially shaped as an elongated rectangle divided into four sections with a pixel group occupying each section. First pixel group 220, second pixel group 230, third pixel group 240, and fourth pixel group 250 may all be disposed on the same semiconductor die.

Figure 2C:
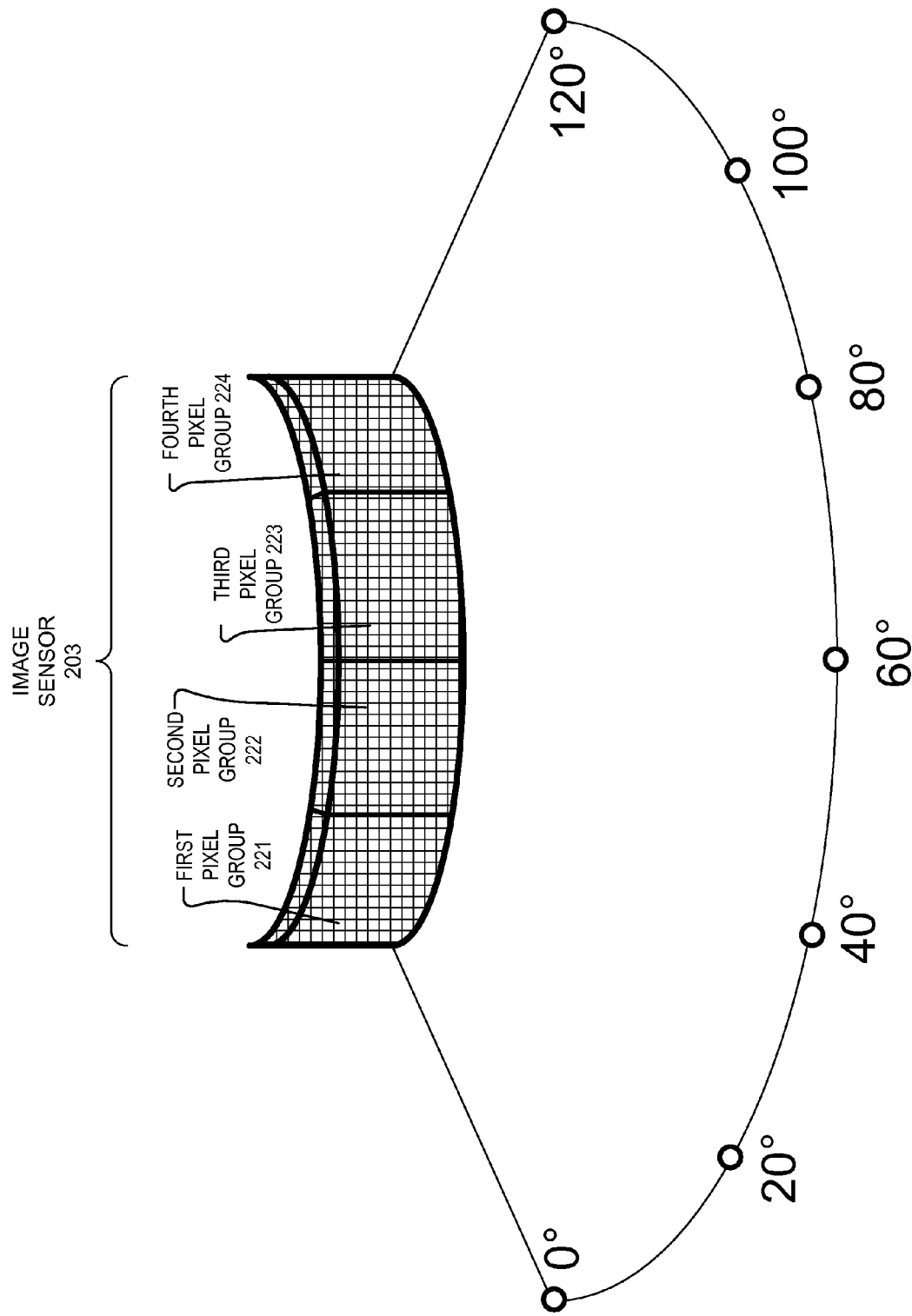
FIG. 2C shows an example image sensor that includes different pixel groups with different fields of view, in accordance with an embodiment of the disclosure.

FIG. 2C shows an example image sensor that includes different pixel groups with different fields of view, in accordance with an embodiment of the disclosure. Image sensor 203 includes first pixel group 221, second pixel group 222, third pixel group 223, and fourth pixel group 224. In one embodiment, each pixel group has a 60 degree field of view, although different fields of view with different angles are possible. In the illustrated embodiment, first pixel group 221 has a field of view from 0° to 60°, second pixel group 222 has a field of view of 20° to 80°, third pixel group 223 has a field of view of 40° to 100°, and fourth pixel group 224 has a field of view of 60° to 120°. In this embodiment, each pixel group has a field of view that overlaps another pixel group. Image sensor 203 may include four different semiconductor dies that each include a pixel group and each semiconductor die may be laterally positioned at an angle relative to another semiconductor die to give each pixel group a different field of view. It is appreciated that the field of view of each pixel group may be affected by lenses or filters placed above the pixel groups.

In the illustrated embodiments of FIGS. 2A, 2B, and 2C, the pixel groups in image sensors 201, 202, and 203 contain the same pixel count and are the same dimension, but configurations with differing pixel counts and differing dimensions are possible. In one embodiment, the first pixel groups, second pixel groups, third pixel groups, and fourth pixel groups have pixel dimensions of common image resolutions (e.g. 640×480, 1280×720, 1920×1080, etc.).

Many of the Figures presented in this disclosure illustrate image sensors that include four pixel groups. In some embodiment, four or more pixel groups are required to capture the desired image, but in other embodiments, image data from two or three pixel groups may be utilized to generate images in a similar fashion as using image data from four pixel groups. Thus, it is appreciated that some embodiments may be scaled to include more or less than the illustrated four pixel groups.

Figure 3:
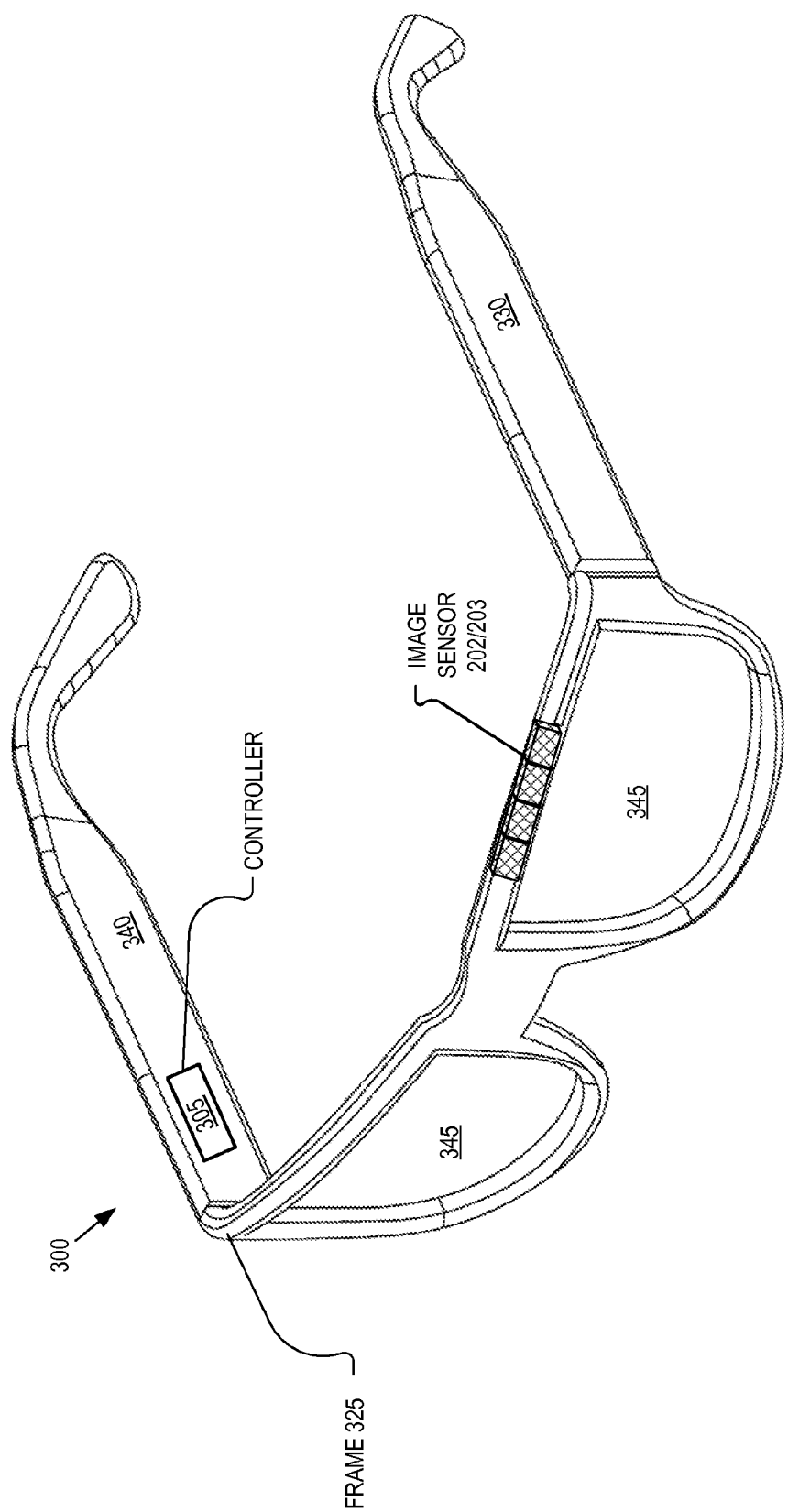
FIG. 3 is a perspective view of example wearable glasses that include an image sensor and electronic components to facilitate human-computer interaction, in accordance with an embodiment of the disclosure.

FIG. 3 is a perspective view of example wearable glasses 300 that include an image sensor (e.g. image sensor 202 or 203) and electronic components (e.g. controller 305) to facilitate human-computer interaction, in accordance with an embodiment of the disclosure. In some cases, the wearable glasses are a head mounted display ("HMD"). An HMD is a display device worn on or about the head. HMDs usually incorporate some sort of near-to-eye optical system to emit a light image within a few centimeters of the human eye. The illustrated embodiment of wearable glasses 300 includes lenses 345 disposed in frame 325 that includes left temple arm 330 and right temple arm 340. Although FIG. 3 illustrates a traditional eyeglass frame 325, embodiments of the present invention are applicable to a wide variety of frame types and styles (e.g. visor, headband, goggles). Traditional eyeglass frame 325 may have a slim frame that does not include enough space to fix a traditional image sensor with an acceptable resolution (e.g. 5 mega-pixels). An image sensor with an elongated shape such as image sensor 202 or image sensor 203 may be more suitable for a slim eyeglass frame. Of course, an image sensor with a traditional shape or image sensor 201 may also be mounted on wearable glasses 300.

Although FIG. 3 illustrates an elongated image sensor (e.g. image sensor 202 or 203), it appreciated that wearable glasses 300 may include a non-elongated image sensor, such as image sensor 201. In one embodiment, wearable glasses 300 includes image sensor 201 (a 2×2 array of pixel groups). In one embodiment, image sensor 201 is mounted in the center of wearable glasses 300, on or about the nose-piece. In one embodiment, two image sensors (e.g. image sensor 201, 202, or 203) are disposed on wearable glasses 300. In one example, one image sensor is disposed (forward facing) in the proximity of where left temple arm 330 meets the portion of frame 325 that secures lens 345 and second image sensor is disposed (forward facing) in the proximity of where right temple arm 340 meets the portion of frame 325 that secures lens 345.

Wearable glasses 300 may include a controller 305 and controller 305 may include an integrated circuit with hardware, firmware, and/or software logic. Controller 305 may be used to receive, transmit, and process data. Controller 305 may receive and process image data and generate images based on software algorithms. Controller 305 may be located in a place or places other than in right temple arm 340.

Figure 4:
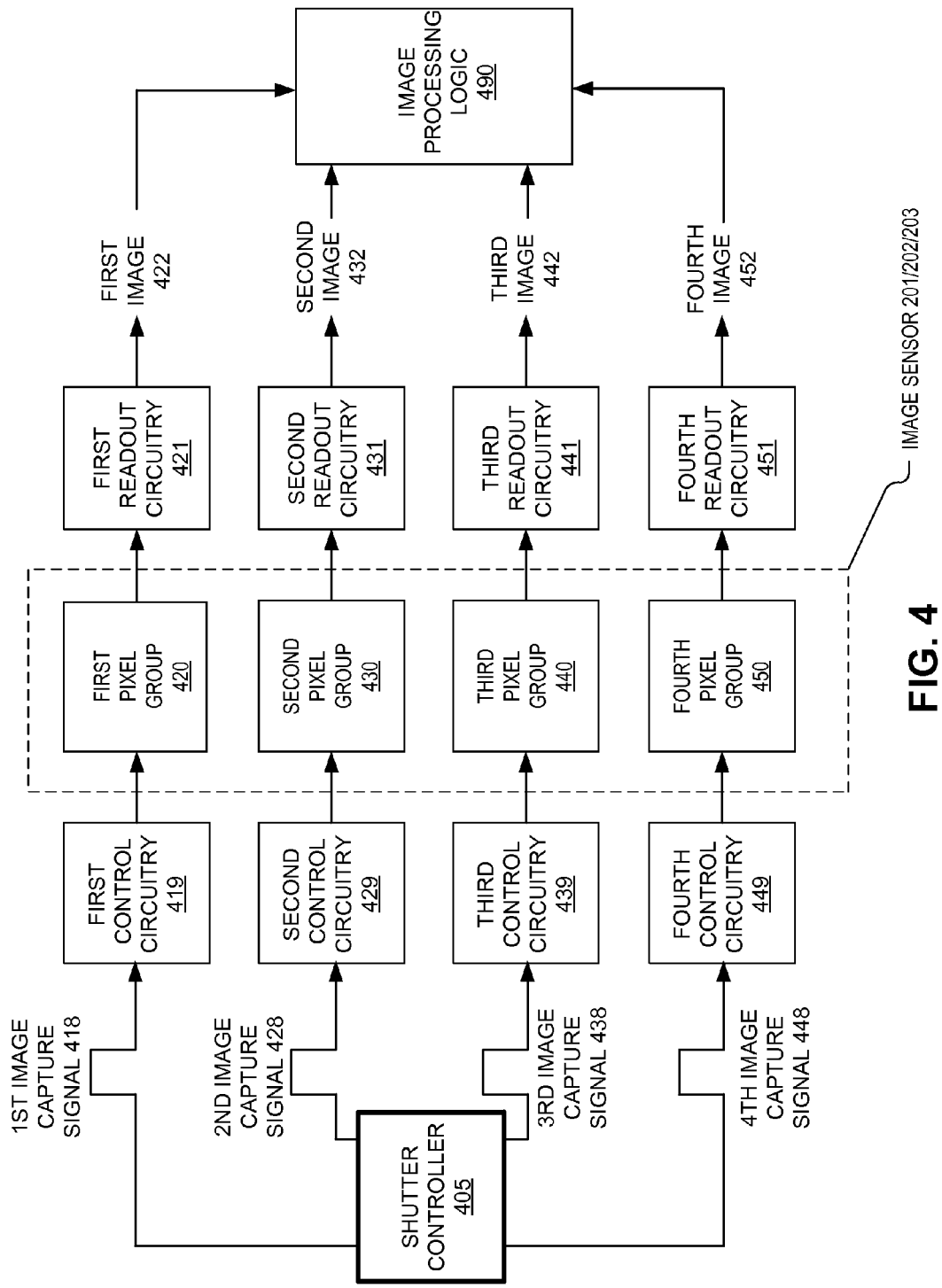
FIG. 4 illustrates an example block diagram that includes elements of a digital imaging device, in accordance with an embodiment of the disclosure.

FIG. 4 illustrates an example block diagram that includes elements of a digital imaging device, in accordance with an embodiment of the disclosure. In the illustrated embodiment, first pixel group 420, second pixel group 430, third pixel group 440, and fourth pixel group 450 are coupled to first control circuitry 419, second control circuitry 429, third control circuitry 439, and fourth control circuitry 449, respectively. It is appreciated that, in one embodiment, first control circuitry 419, second control circuitry 429, third control circuitry 439, and fourth control circuitry 449 may share electrical components and may be considered to be a single control circuitry module. In the illustrated embodiment, first control circuitry 419, second control circuitry 429, third control circuitry 439, and fourth control circuitry 449 are coupled to receive first image capture signal 418, second image capture signal 428, third image capture signal 438, and fourth image capture signal 448, respectively.

Shutter controller 405 is coupled to transmit the image capture signals. Shutter controller 405 is coupled to initiate a first exposure period of first pixel group 420 by sending first image capture signal 418 to first control circuitry 419, which facilitates the first exposure period. Shutter controller 405 also transmits image capture signals 428, 438, and 448 to control circuitry 429, 439, and 449 to facilitate second, third, and fourth exposure periods of the pixel groups 430, 440, and 450, respectively.

In the illustrated embodiment, first readout circuitry 421 reads out first image data from first pixel group 420 and readout circuitry 431, 441, and 451 function similarly to read out second, third, and fourth image data from the second, third, and fourth pixel groups. Image processing logic 490 receives first image 422, second image 432, third image 442, and fourth image 452 from the respective readout circuitry for further processing. Image processing logic 490 may include a processor and memory in order to edit, process, and combine image data. It is appreciated that, in one embodiment, first readout circuitry 421, second readout circuitry 431, and third readout circuitry 441 may share electrical components and may be considered to be a single readout circuitry module. In the illustrated embodiment, first pixel group 420, second pixel group 430, third pixel group 440, and fourth pixel group 450 are disposed in image sensor 201 or 202 and the other circuitry is not integrated into image sensor 201. In one embodiment, image sensor 201 or 202 includes the illustrated control circuitry and readout circuitry. Other Figures in the disclosure may not specifically show control circuitry and readout circuitry associated with each pixel group, but each pixel group may include control circuitry and readout circuitry, as described in the description of FIG. 4.

Figure 5:
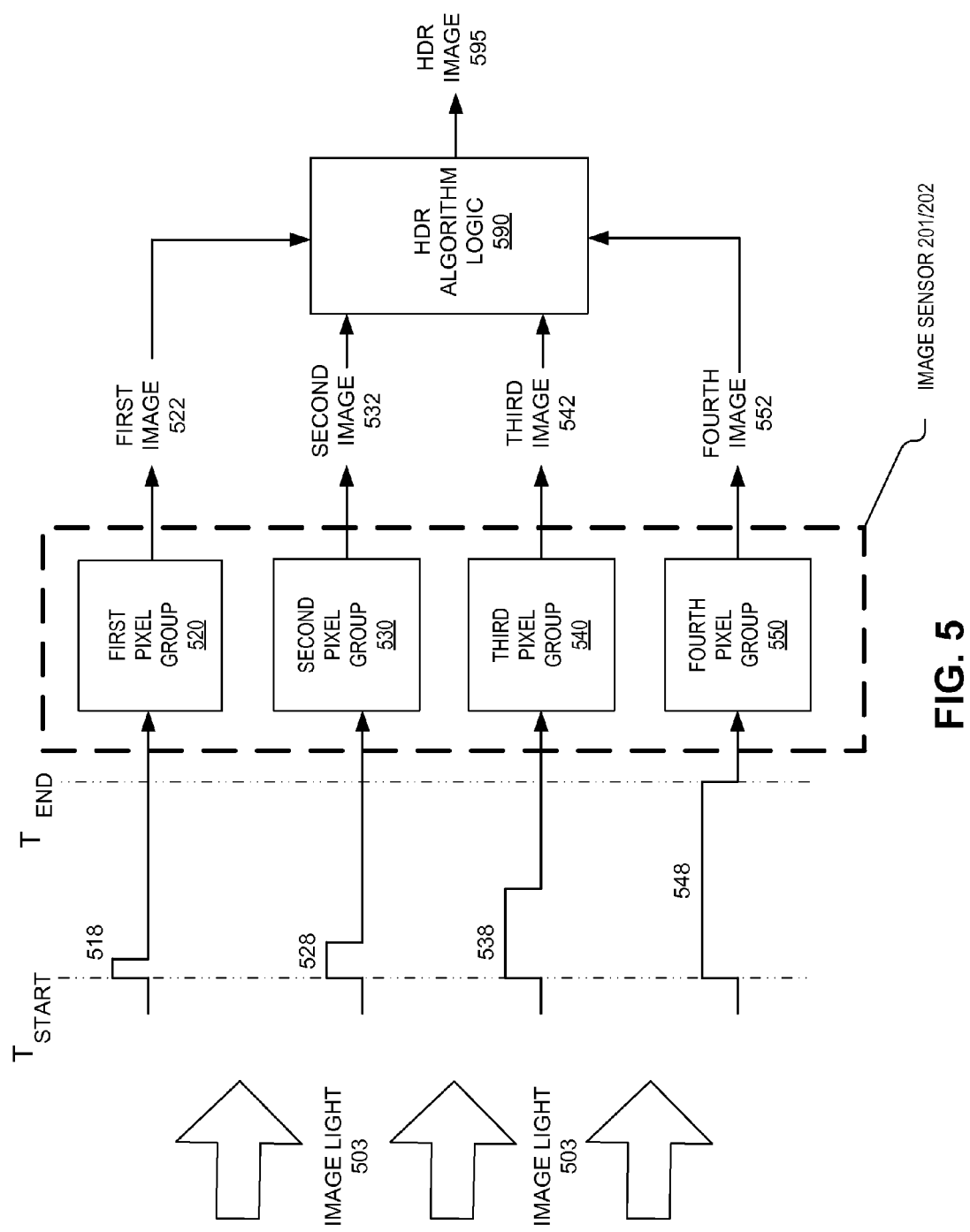
FIG. 5 illustrates an example block diagram and an example timing diagram for generating a high dynamic range ("HDR") image with an image sensor, in accordance with an embodiment of the disclosure.

FIG. 5 illustrates an example block diagram and an example timing diagram for generating a high dynamic range ("HDR") image 595 with an image sensor, in accordance with an embodiment of the disclosure. FIG. 5 shows first pixel group 520, second pixel group 530, third pixel group 540, and fourth pixel group 550 facing substantially the same direction and receiving image light 503. First pixel group 520, second pixel group 530, third pixel group 540, and fourth pixel group 550 may be examples of the pixel groups shown in connection with image sensors 201 and 202. In the illustrated embodiment, first image capture signal 518 exposes first pixel group 520 to image light 503 for a first exposure period that has a duration that is less than the exposure periods of the other pixel groups. Similarly, second image capture signal 528, third image capture signal 538, and fourth image capture 548 expose the respective pixel groups for different durations. The image capture signals may come from shutter controller 405. In the illustrated embodiment, the first, second, third, and fourth exposure periods start at time $T_{START}$, meaning images 522, 532, 542, and 552 are captured, at least in part, contemporaneously. If the photographer desires to capture a scene with movement, the semi-contemporaneous image captures may be advantageous when compared with methods of generating HDR images that include capturing images serially. Capturing images serially (one after the other) to produce an HDR image has the inherent risk of objects in the scene moving too quickly to effectively use HDR algorithms.

HDR algorithm logic 590 receive first image 522, second image 532, third image 542, and fourth image 552 from the respective pixel groups and generates HDR image 595. After receiving the images, HDR algorithm logic 590 may intelligently combine the images using known HDR methods to generate HDR image 595. It is appreciated that HDR algorithm logic 590 may need to perform certain other additional algorithms on first image 522, second image 532, third image 542, and fourth image 552 to generate HDR image 595. For example, if the first, second, third, and fourth pixel groups face substantially the same direction and image substantially the same scene or field of view, HDR algorithm logic 590 may need to crop the received images to generate a HDR image 595 with the same field of view.

Figure 6:
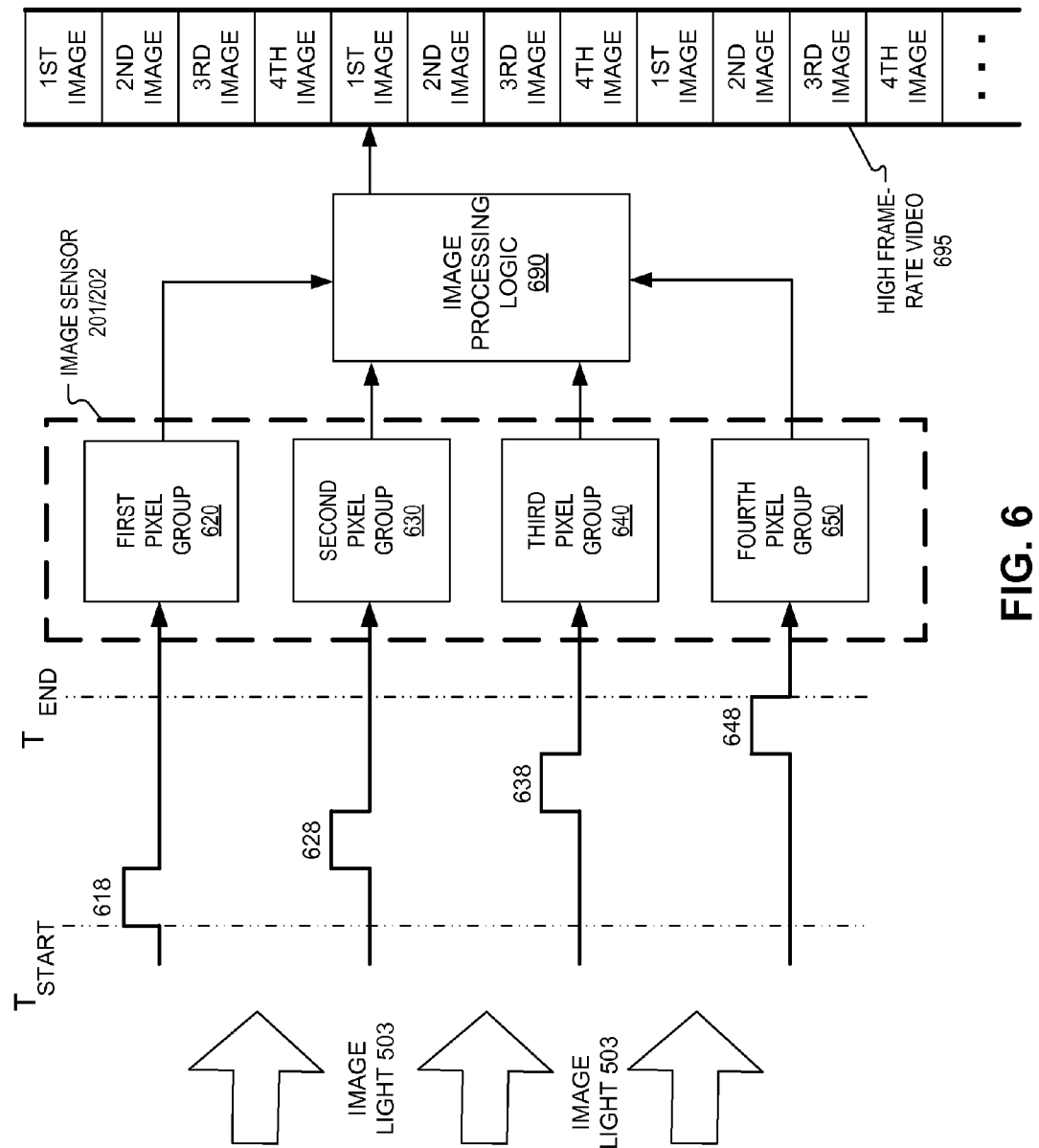
FIG. 6 illustrates an example block diagram and an example timing diagram for generating high frame-rate video with an image sensor, in accordance with an embodiment of the disclosure.

FIG. 6 illustrates an example block diagram and an example timing diagram for generating high frame-rate video with an image sensor, in accordance with an embodiment of the disclosure. FIG. 6 shows first pixel group 620, second pixel group 630, third pixel group 640, and fourth pixel group 650 facing substantially the same direction and receiving image light 503. First pixel group 520, second pixel group 530, third pixel group 540, and fourth pixel group 550 may be examples of the pixel groups shown in connection with image sensors 201 and 202. In the illustrated embodiment, first image capture signal 618, second image capture signal 628, third image capture signal 638, and fourth image capture signal 648 initiate exposure periods (in serial) for their respective pixel groups. In this embodiment, first pixel group 620 captures an image, followed by second pixel group 630 capturing an image, followed by third pixel group 640 capturing an image, followed by fourth pixel group 650 capturing an image.

Image processing logic 690 receives these images from the pixel groups and generates a high frame-rate video 695 using the images. Image processing logic 690 is coupled to output high frame-rate video 695 generated by interleaving at least a portion of pixel data received from the pixel groups. For example, first pixel data from first pixel group 620, second pixel data from second pixel group 630, third pixel data from third pixel group 640, and fourth pixel data from fourth pixel group 650 may be interleaved to generate high frame-rate video 695. It is appreciated that image processing logic 690 may need to perform certain other additional algorithms on the received images to generate high frame-rate video 695. For example, if the first, second, third, and fourth pixel groups face substantially the same direction and image substantially the same scene or field of view, image processing logic 690 may need to crop the received images to generate high frame-rate video 695. For example, image processing logic 690 may need to compare second pixel data with first pixel data and third pixel data to determine a field of view commonality between the images before finalizing a $2^{nd}$ image in high frame-rate video 695.

Using two or more pixel groups to generate high frame-rate video is potentially advantageous over using a single pixel group or pixel array to generate high frame-rate video because the frame rate of the video will not necessarily be limited by pixel readout times of the pixel groups. In one example, four pixel groups capture 30 frames per second. With image processing logic 690 interleaving the pixel data from each pixel group, high frame-rate video could potentially be 120 frames per second. If image sensor 201 or 202 had only three pixel groups capturing images at 30 frames per second, image processing logic could interleave the pixel data and potentially generate 90 frames per second high frame-rate video.

Figure 7:
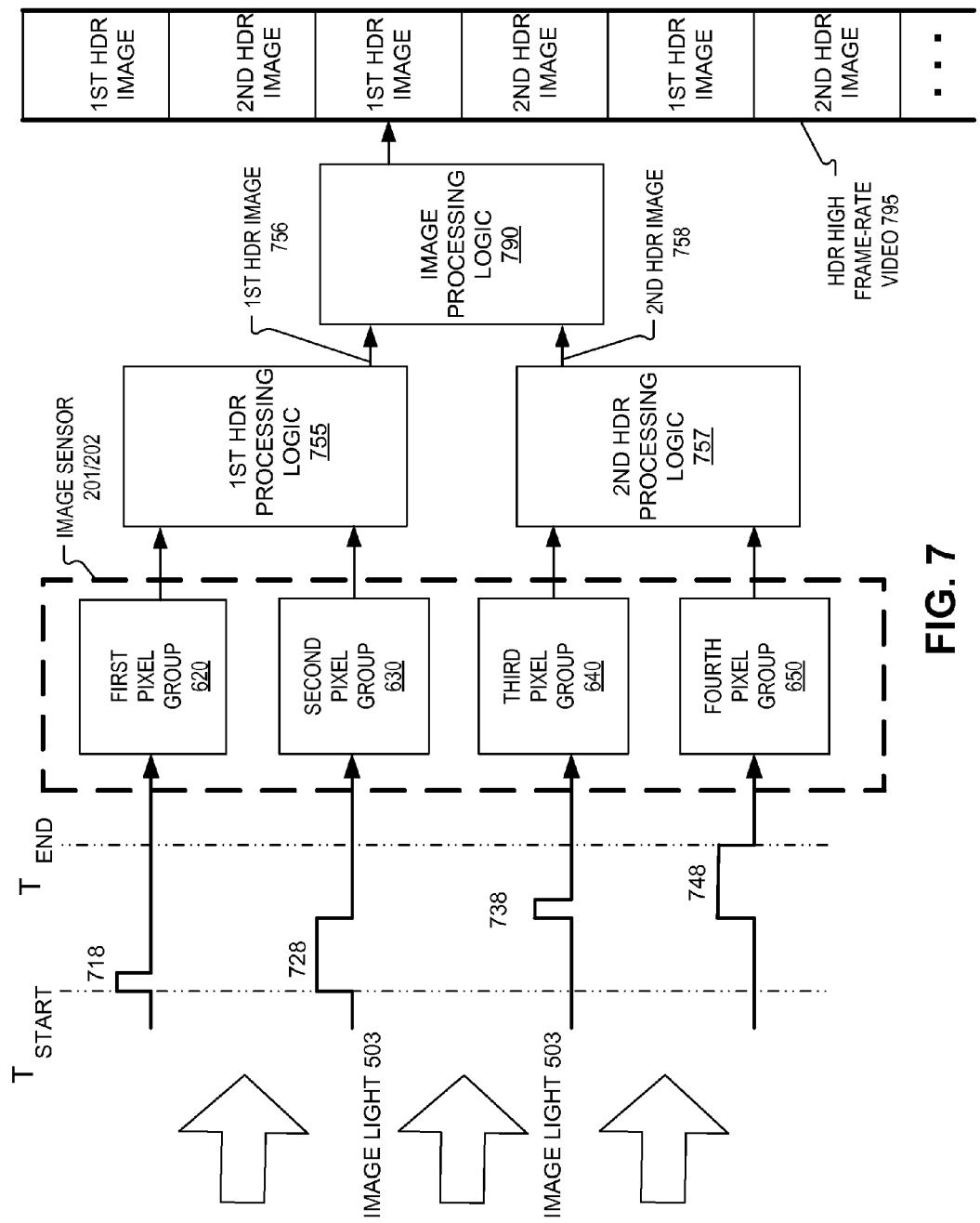
FIG. 7 illustrates an example block diagram and an example timing diagram for generating HDR high-frame rate video with an image sensor, in accordance with an embodiment of the disclosure.

FIG. 7 illustrates an example block diagram and an example timing diagram for generating HDR high-frame rate video with an image sensor, in accordance with an embodiment of the disclosure. FIG. 7 shows first pixel group 620, second pixel group 630, third pixel group 640, and fourth pixel group 650 facing substantially the same direction and receiving image light 503. In the illustrated embodiment, first image capture signal 718 exposes first pixel group 620 to image light 503 for a shorter duration than second image capture signal 728 exposes second pixel group 630 to image light 503. Also in the illustrated embodiment, third image capture signal 738 exposes third pixel group 640 after second pixel group 630 is exposed to image light 503. Third image capture signal 738 exposes third pixel group 640 to image light 503 for a shorter duration than fourth image capture signal 748 exposes fourth pixel group 650 to image light 503. Essentially, first pixel group 620 and second pixel group 630 capture image data for a first composite image (e.g. first HDR image 756) and third pixel group 640 and fourth pixel group capture image data for a second composite image (e.g. second HDR image 758) that is captured after the image data to generate the first composite image.

In the illustrated embodiment, first HDR processing logic 755 receives first pixel data from first pixel group 620 and receives second pixel data from second pixel group 630 and generates a composite image such as first HDR image 756. Second HDR processing logic 757 receives third pixel data from third pixel group 640 and receives fourth pixel data from fourth pixel group 650 and generates a composite image such as second HDR image 758. Still referring to the illustrated embodiment, image processing logic 790 receives first HDR image 756 and second HDR image 758 and interleaves the HDR images (or edited versions of the HDR images) into HDR high frame-rate video 795. Image processing logic 790 may need to perform additional algorithms on first HDR image 756 and second HDR image 758 to generate HDR high frame-rate video 795, such as cropping the received HDR images. It is appreciated that first HDR processing logic 755, second HDR processing logic 757 and image processing logic 790 may be combined into one processor, a field programmable gate array ("FPGA"), or otherwise. It is also appreciated that additional algorithms may be performed on the first, second, third, and fourth pixel data prior to combining the pixel data into HDR images that are included in HDR high frame-rate video 795.

Figure 8:
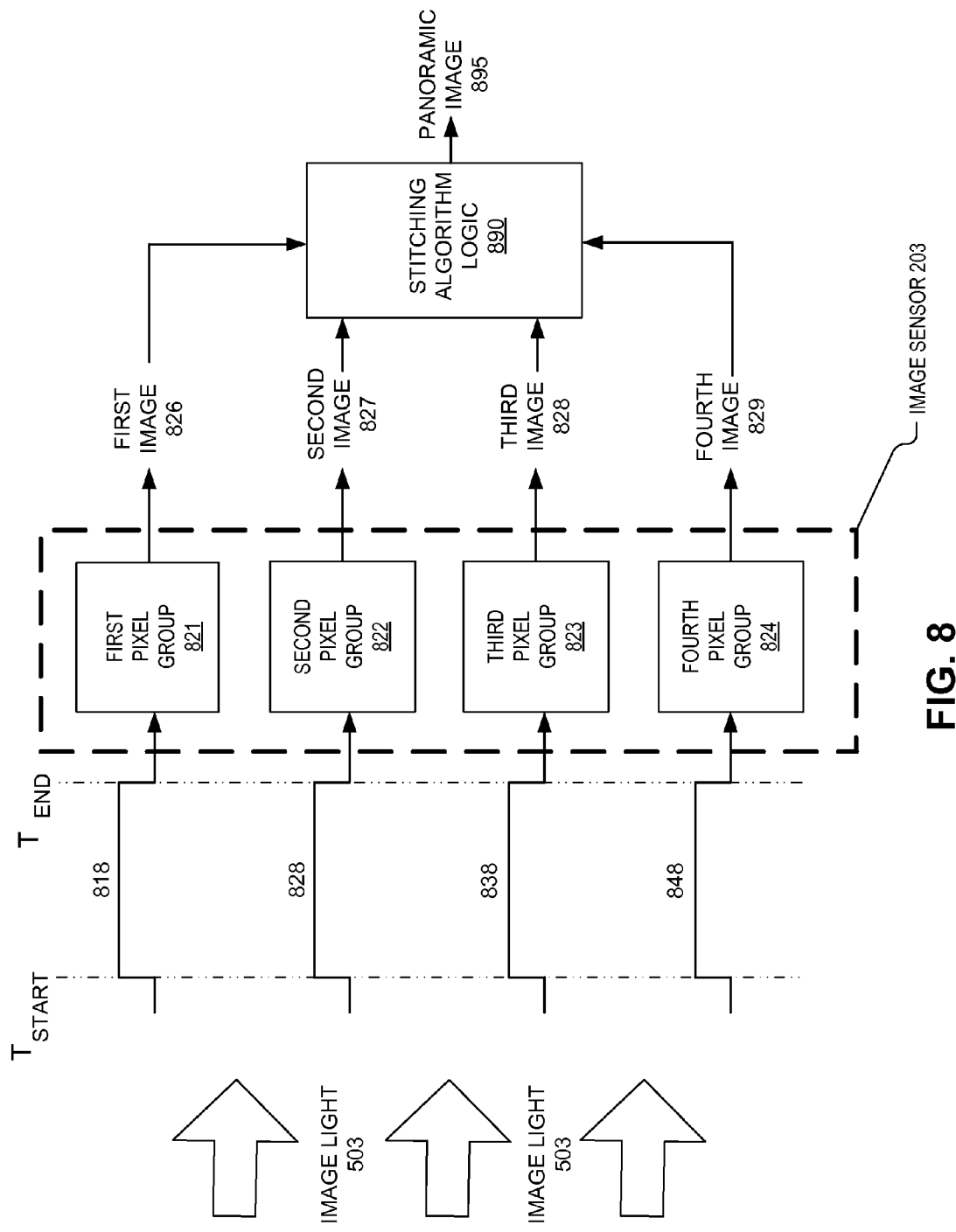
FIG. 8 illustrates an example block diagram and an example timing diagram for generating an image with an expanded field of view with an image sensor, in accordance with an embodiment of the disclosure.

FIG. 8 illustrates an example block diagram and an example timing diagram for generating an image with an expanded field of view with an image sensor, in accordance with an embodiment of the disclosure. FIG. 8 shows first pixel group 821, second pixel group 822, third pixel group 823, and fourth pixel group 824 receiving image light 503. First pixel group 821 has a first field of view that partially overlaps a second field of view of second pixel group 822. Third pixel group 823 has a third field of view that partially overlaps the second field of view of second pixel group 822 and fourth pixel group 824 has a fourth field of view that partially overlaps the third field of view of third pixel group 823. In one example, each pixel group has an approximately 60° field of view. In one example, first pixel group 821 has a field of view from 0° to 60°, second pixel group 822 has a field of view from 20° to 80°, third pixel group 823 has a field of view from 40° to 100°, and fourth pixel group 824 has a field of view from 60° to 120°.

In the illustrated embodiment, image capture signals 818, 828, 838, and 848 expose their respective pixel groups for exposure periods with a same duration. Shutter control circuitry (e.g. shutter controller 405) may be used to simultaneously initiate the exposure periods. Stitching algorithm logic 890 receives first image 826, second image 827, third image 828, and fourth image 829 (from their respective pixel groups) and combines the images to generate a composite image. In one embodiment, stitching algorithm logic 890 combines first image 826, second image 827, third image 828, and fourth image 829 by stitching them together and outputs a panoramic image 895. Panoramic images may include 120° (or more) field of view based on the combined field of view of the four pixel groups. Since the exposure periods are initiated simultaneously, panoramic image 895 may include images capture contemporaneously, rather than images captured serially. It is appreciated that although the illustrated embodiment illustrates four pixel groups, the design could also be applied to two or three pixel groups to generate a panoramic image.

Figure 9:
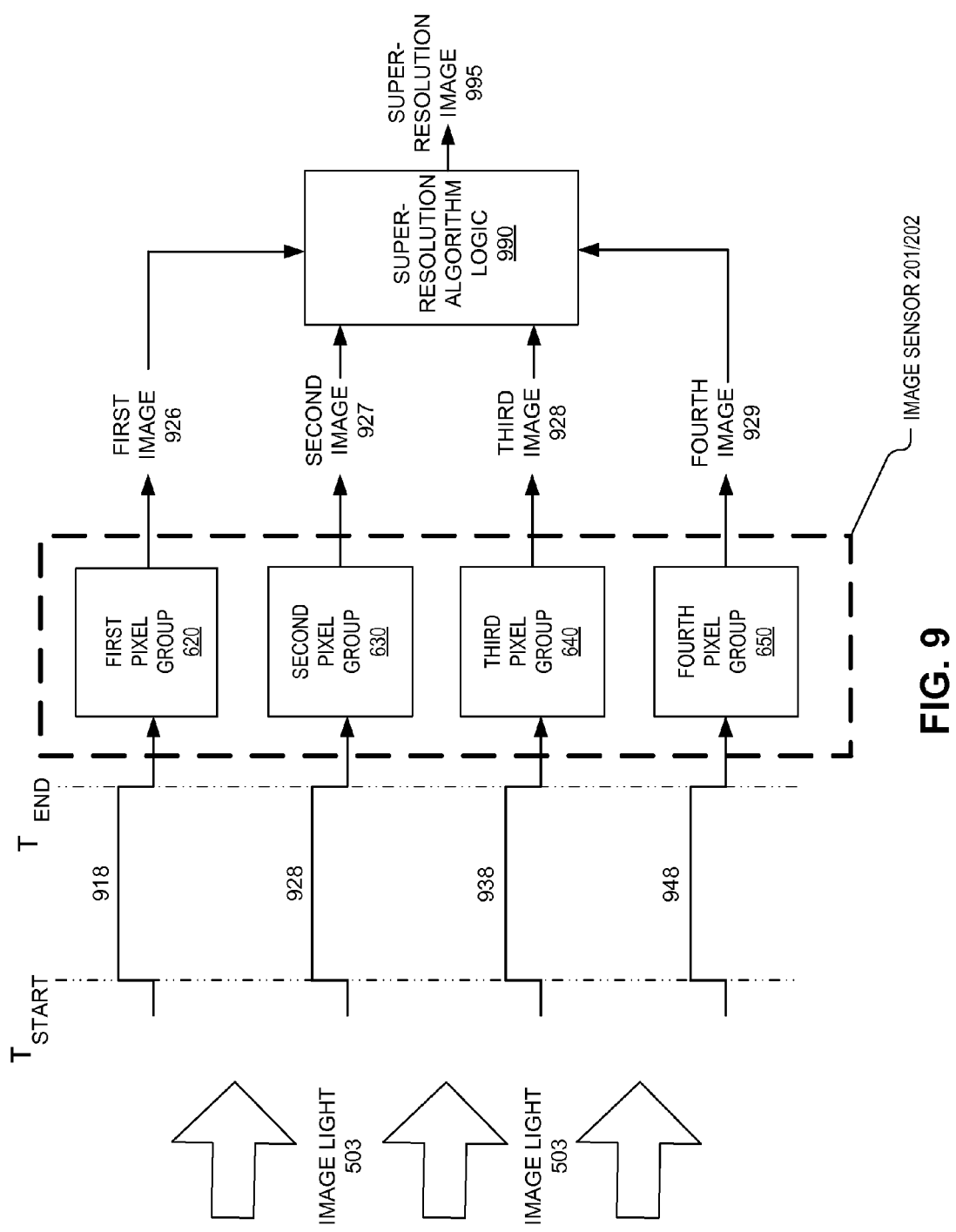
FIG. 9 illustrates an example block diagram and an example timing diagram for generating a super-resolution image with an image sensor, in accordance with an embodiment of the disclosure.

FIG. 9 illustrates an example block diagram and an example timing diagram for generating a super-resolution image with an image sensor, in accordance with an embodiment of the disclosure. FIG. 9 shows first pixel group 620, second pixel group 630, third pixel group 640, and fourth pixel group 650 facing substantially the same direction and receiving image light 503. In the illustrated embodiment, image capture signals 918, 928, 938, and 948 expose their respective pixel groups for exposure periods with a same duration. In the illustrated embodiment, super-resolution algorithm logic 990 receives first image 926 from first pixel group 620 and receives second image 927 from second pixel group 630. Super-resolution algorithm logic 990 receives third image 928 and fourth image 929 from third and fourth pixel group 640 and 650, respectively. Super-resolution algorithm logic 990 is coupled to output a composite image (e.g. super resolution image 995) by performing a super-resolution algorithm on the pixel data of the received images. In this way, super-resolution algorithm logic 990 generates a higher resolution image than the individual resolution of each of the pixel groups.

In one embodiment, each of the pixel groups 620, 630, 640, and 650 are approximately 1 mega-pixel ("MP"). However, an image with higher resolution than 1 MP can be generated by combining first image 926, second image 927, third image 928, and fourth image 929. Where a device such as an HMD or wearable glasses 300 have limited real estate to place a higher resolution image sensor (e.g. 5 MP), it may still be able to generate relatively high resolution images using an image sensor such as image sensor 202.

Figure 10:
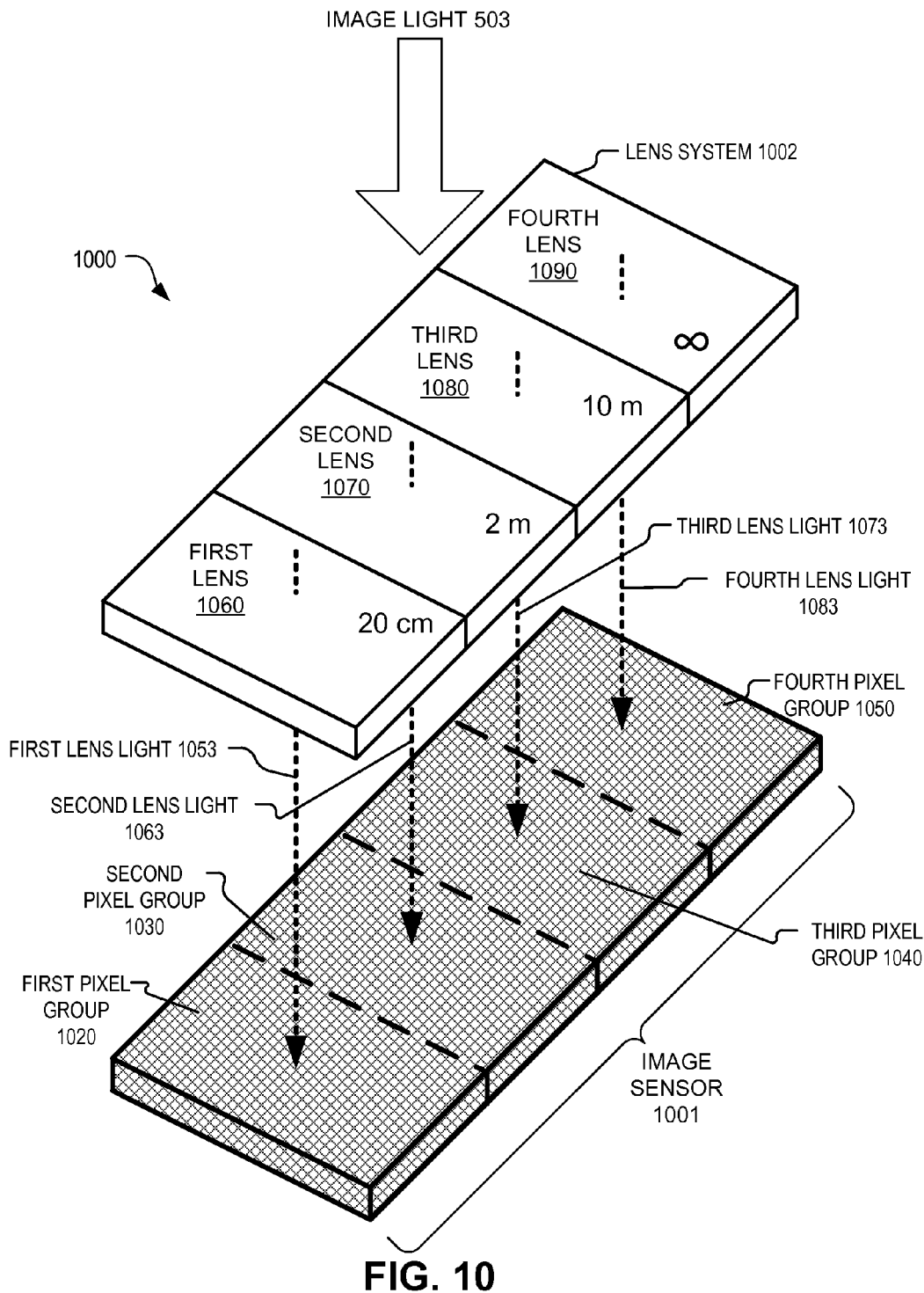
FIG. 10 illustrates an example lens system of a digital imaging device that includes different lenses focusing image light on different groups of pixels of an image sensor, in accordance with an embodiment of the disclosure.

FIG. 10 illustrates an example lens system of a digital imaging device that includes different lenses focusing image light on different groups of pixels of an image sensor, in accordance with an embodiment of the disclosure. Digital imaging device 1000 includes image sensor 1001, which includes first pixel group 1020, second pixel group 1030, third pixel group 1040, and fourth pixel group 1050. In the illustrated embodiment, first pixel group 1020, second pixel group 1030, third pixel group 1040, and fourth pixel group 1050 contain the same pixel count and are the same dimension, but configurations with differing pixel counts and differing dimensions are possible. In one embodiment, first pixel group 1020, second pixel group 1030, third pixel group 1040, and fourth pixel group 1050 have pixel dimensions of common image resolutions (e.g. 640×480, 1280×720, 1920×1080, etc.).

Lens system 1002 includes first lens 1060, second lens 1070, third lens 1080, and fourth lens 1090. First lens 1060 focuses image light 503 on first pixel group 1020. First lens light 1053 is the portion of image light 503 that travels through first lens 1060 and is focused on first pixel group 1020. Second lens light 1063 is the portion of image light 503 that travels through second lens 1070 and is focused on second pixel group 1030. Third lens light 1073 is the portion of image light 503 that travels through third lens 1080 and is focused on third pixel group 1040. And, fourth lens light 1083 is the portion of image light 503 that travels through fourth lens 1090 and is focused on fourth pixel group 1050. It is appreciated that each of first lens 1060, second lens 1070, third lens 1080, and fourth lens 1090 may include more than a single lens, which may be aligned axially.

In the illustrated embodiment, first lens 1060 is configured to focus a subject approximately 20 centimeters away from image sensor 1001; second lens 1070 is configured to focus subjects approximately two meters away from image sensor 1001; third lens 1080 focuses subjects at approximately 10 meters; and fourth lens 1090 focuses subjects at essentially infinity. Therefore, image sensor 1001 will be able to image a scene with multiple depths of field that are centered around 20 cm, two meters, ten meters, and essentially infinity. First lens 1060 may be configured to facilitate reading QR codes and/or bar codes. It is appreciated that digital imaging device 1000 may have four different depths of field that converge or overlap. In one embodiment, first lens 1060, second lens 1070, third lens 1080, and fourth lens 1090 are substantially the same, but have a different separation distance from their respective pixel group, which provides different focus distances to the different pixel groups.

Of course, different lenses that are configured to focus at distances other than the distances specified above are possible. Similar imaging systems may incorporate more or less lenses and pixel groups. In one embodiment, lens system 1002 includes three lenses disposed over three pixel groups. In one embodiment, lens system 1002 includes only two lenses that focus image light 503 on two pixel groups.

In the illustrated embodiment, the pixels of the different pixel groups border or come very close to bordering pixels of other pixel groups. However, in some embodiments, pixels of the different pixel groups may be separated by some distance, instead of bordering each other.

Figure 11:
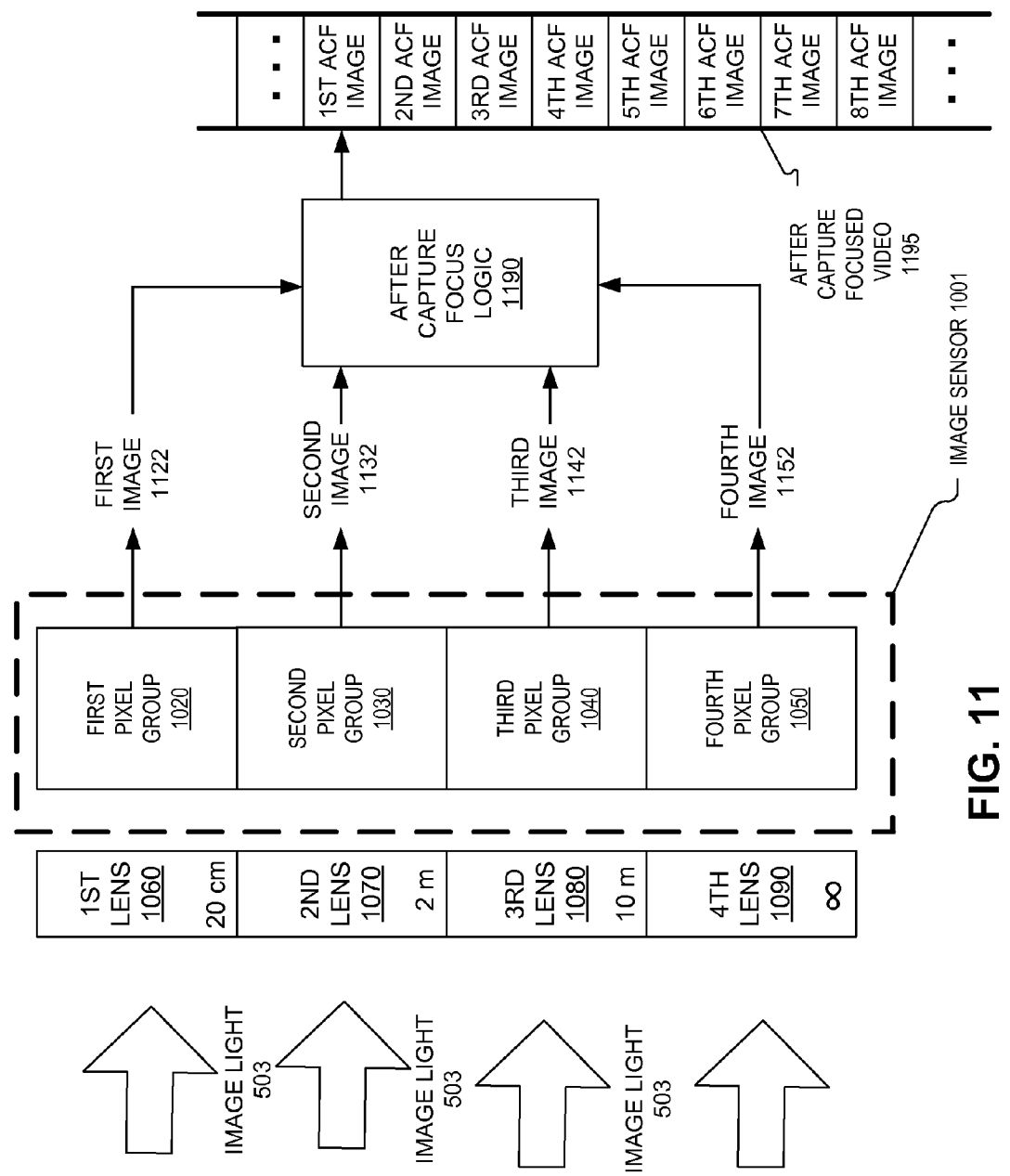
FIG. 11 illustrates an example block diagram that includes different lenses focusing image light on different groups of pixels of an image sensor for generating after capture focused video, in accordance with an embodiment of the disclosure.

FIG. 11 illustrates an example block diagram that includes different lenses focusing image light on different groups of pixels of an image sensor for generating after capture focused video, in accordance with an embodiment of the disclosure. FIG. 11 shows first pixel group 1020, second pixel group 1030, third pixel group 1040, and fourth pixel group 1050. First pixel group 1020, second pixel group 1030, third pixel group 1040, and fourth pixel group 1050 may all measure lens light in response to a common image capture signal, which may be sent from shutter controller 405. The measurements of lens light may be contemporaneous.

In response to the image capture signal, first pixel group 1020 measures first lens light 1053 that has traveled through first lens 1060. Second pixel group 1030 measures second lens light 1063, in response to the image capture signal. Likewise third pixel group 1040 and fourth pixel group 1050 measure third lens light 1073 and fourth lens light 1083, respectively, in response to the image capture signal.

A first set of four images (e.g. first image 1122, second image 1132, third image 1142, and fourth image 1152) are captured by measuring the lens light and the images are sent to after capture focus ("ACF") logic 1190. ACF logic 1190 uses first image 1122, second image 1132, third image 1142, and fourth image 1152 to generate a first ACF image. Shutter controller 405 may then initiate another image capture signal and the pixel groups may capture a second set of four images. ACF logic 1190 may then use the second set of four images to generate a second ACF image. This process may be repeated so that a series of ACF images are generated (e.g. $1^{st}$ ACF image, $2^{nd}$ ACF image, $3^{rd}$ ACF image . . . ) and the series of ACF images can be made into ACF video 1195.

To generate each ACF image, ACF processing may be performed on first image 1122, second image 1132, third image 1142, and fourth image 1152. For example, ACF logic 1190 may analyze image data from the received images to determine areas of the image data that are in focus. ACF logic 1190 may save in memory or discard all or parts of the first and second image data based on the analysis. In one embodiment, the image evaluation logic selects images based on the analysis of the focus and transfers the image data to an additional processor (not shown) for further processing. Because two or more (e.g. four) images may be captured simultaneously with different focus distances, the image data from the two or more images can be combined in a post-processing algorithm (performed by ACF logic 1190), which may be performed in a processor. Given all of the image data (with different focus distances) collected of a scene, it is possible to construct an image that can be refocused with post-processing, after the images (e.g. 1122, 1132, 1142, and 1152) are captured. As with many of the embodiments presented in this disclosure, the system shown in FIG. 11 may be modified from four groups of pixels and four lenses to include any number of groups of pixels and corresponding lenses.

Figure 12:
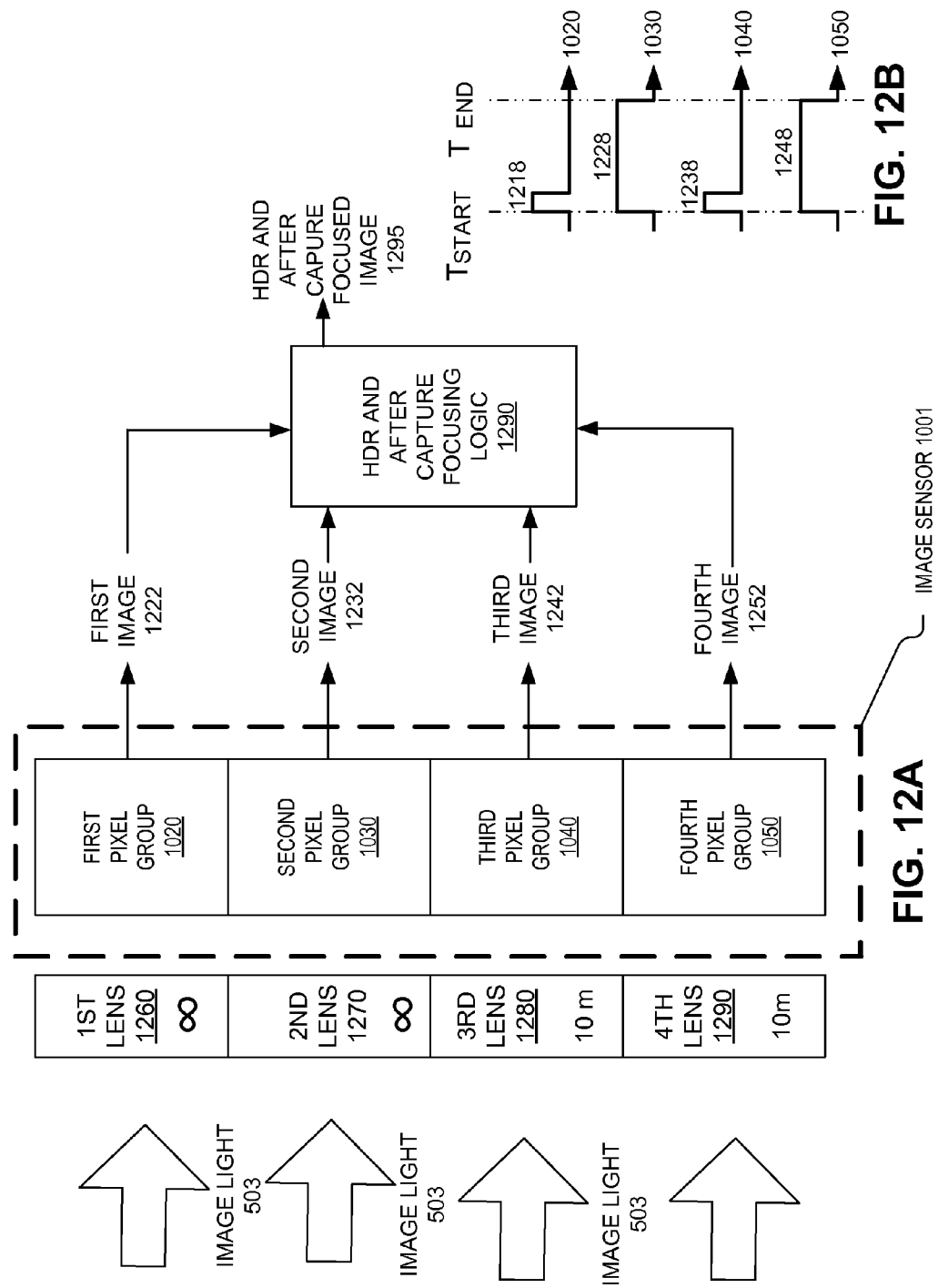
FIGS. 12A and 12B illustrate an example timing diagram and an example block diagram that includes different lenses focusing image light on different groups of pixels of an image sensor for generating an HDR after capture focused image, in accordance with an embodiment of the disclosure.

FIGS. 12A and 12B illustrate an example timing diagram and an example block diagram that includes different lenses focusing image light on different groups of pixels of an image sensor for generating an HDR/ACF image, in accordance with an embodiment of the disclosure. FIG. 12A shows first pixel group 1020, second pixel group 1030, third pixel group 1040, and fourth pixel group 1050 receiving image light 503 through first lens 1260, second lens 1270, third lens 1280, and fourth lens 1290, respectively. First lens 1260 and second lens 1270 are configured to focus image light 503 from a same distance (e.g. essentially infinity) on first pixel group 1020 and second pixel group 1020. In one embodiment, first lens 1260 and second lens 1270 are combined into one lens. Third lens 1280 and fourth lens 1290 are configured to focus image light 503 from a same distance (e.g. 10 meters) on third pixel group 1040 and fourth pixel group 1050. In one embodiment, third lens 1280 and fourth lens 1290 are combined into one lens. First lens 1260 and second lens 1270 may be configured to focus image light 503 at a certain distance (e.g. essentially infinity) that is different from the distance (e.g. 10 meters) that third lens 1280 and fourth lens 1290 focus image light 503 by using different optical powers. First lens 1260 and second lens 1270 may be configured to focus image light 503 at a certain distance (e.g. essentially infinity) that is different from the distance (e.g. 10 meters) that third lens 1280 and fourth lens 1290 focus image light 503 by positioning the respective lenses at different distances from the respective pixel groups.

FIG. 12B shows an example timing diagram that can be used in connection with FIG. 12A. In the illustrated embodiment, image capture signal 1218 exposes first pixel group 1020 for a first duration that is shorter than a second duration that pixels of second pixel group 1030 are exposed to image light 503 in response to image capture signal 1228. Also in the illustrated embodiment, image capture signal 1238 exposes third pixel group 1040 for a third duration that is shorter than a fourth duration that pixels of fourth pixel group 1050 are exposed to image light 503 in response to image capture signal 1248. A shutter controller, such as shutter controller 405 may initiate the image capture signals.

In the illustrated embodiment, HDR/ACF image logic 1290 receives first image 1222 from first pixel group 1020 and receives second image 1232 from second pixel group 1030. HDR/ACF image logic 1290 receives third image 1242 and fourth image 1252 from third and fourth pixel group 1040 and 1050, respectively. HDR/ACF image logic 1290 is coupled to output an HDR/ACF image 1295 by performing an HDR algorithm and an ACF algorithm on the pixel data received from the four images. Essentially, in the illustrated embodiment, first pixel group 1020 and second pixel group 1030 are configured to generate a first HDR image at a first focus distance (e.g. essentially infinity). Contemporaneously, third pixel group 1040 and fourth pixel group 1050 are configured to generate a second HDR image at a second focus distance (e.g. 10 meters). In one embodiment, after generating the first and second HDR image, HDR/ACF image logic 1290 then performs an ACF algorithm on the two HDR images. The result is HDR/ACF image logic 1290 generating and outputting HDR/ACF image 1295 that is an HDR image that has been focused after the image captures.

Figure 13:
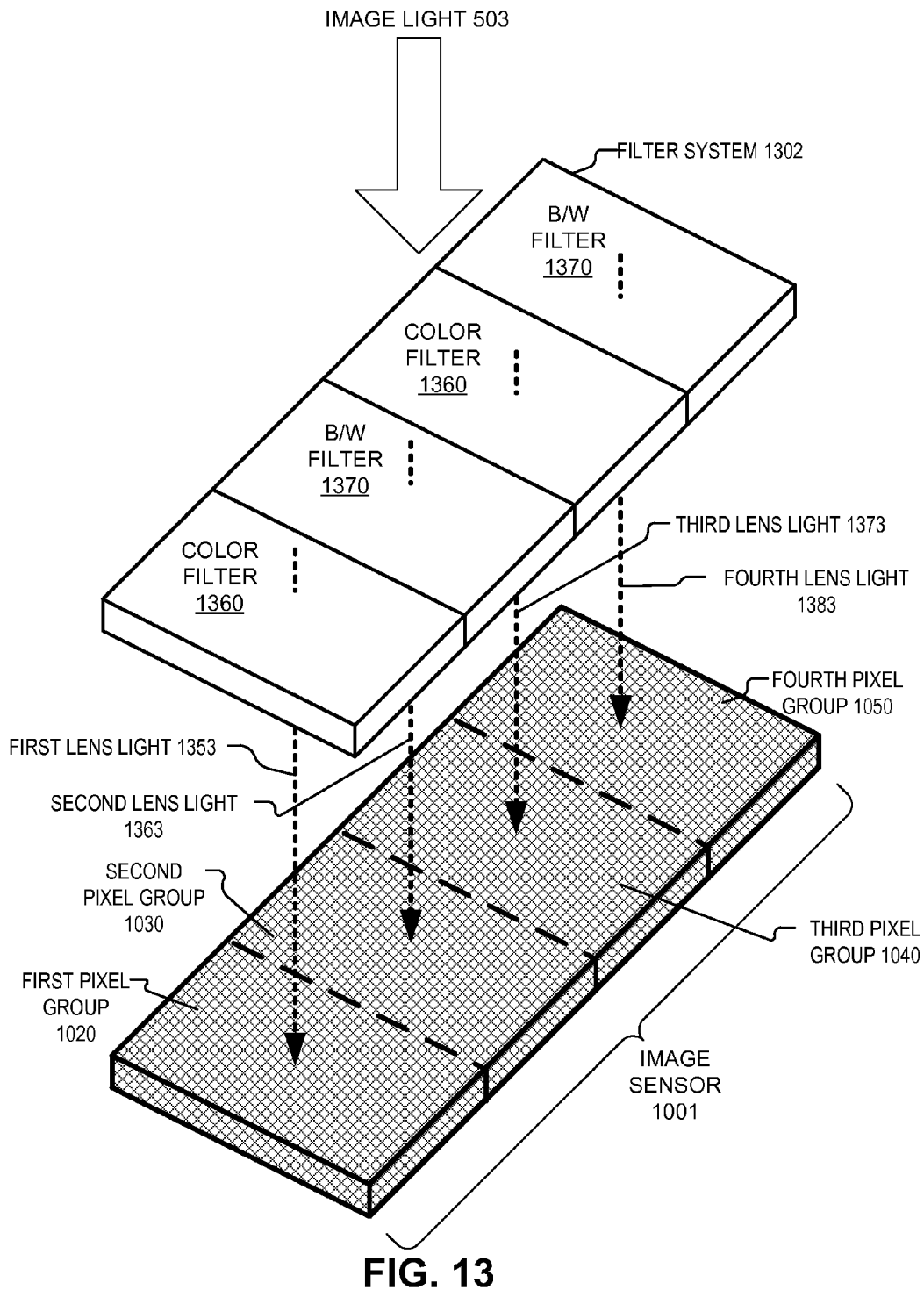
FIG. 13 illustrates an example filter system that filters image light directed toward different pixel groups of an image sensor, in accordance with an embodiment of the disclosure.

FIG. 13 illustrates an example filter system that filters image light directed toward different pixel groups of an image sensor, in accordance with an embodiment of the disclosure.

FIG. 13 shows first pixel group 1020 and third pixel group 1040 receiving image light 503 through a color filter 1360. The portion of image light 503 that first pixel group 1020 receives is first lens light 1353. The portion of image light 503 that third pixel group 1040 receives is third lens light 1373. Second pixel group 1030 and fourth pixel group 1050 receive image light 503 through a black and white filter 1370. The portion of image light 503 that second pixel group 1030 receives is second lens light 1363. The portion of image light 503 that fourth pixel group 1050 receives is fourth lens light 1383. In one embodiment, black and white filter 1370 is replaced with no filter, in other words, second pixel group 1030 and fourth pixel group 1050 do not receive image light 503 through a color filter. The absence of a color filter may give second pixel group 1030 and fourth pixel group 1050 the ability to receive better light data (and possibly have higher dynamic range) in low light situations. Color filter 1360 may be a red/green/blue ("RGB") filter or a Bayer filter. Color filter 1360 may be disposed much closer to the pixels of the pixel groups than what is shown in FIG. 13.

Shutter control circuitry (e.g. shutter controller 405) may be coupled to the pixel groups and cause them to simultaneously measure light for a same exposure period. Image processing logic (e.g. image processing logic 490) can receive each image generated by each of the pixel groups and then generate a light-enhanced image. The image processing logic may use a light enhancement algorithm that takes light intensity data from second pixel group 1030 and fourth pixel group 1050 and combines the light intensity data with color data from first pixel group 1020 and third pixel group 1040. Combining the light intensity data with the color data may give the light-enhanced image better dynamic range.

FIG. 14 shows an example block diagram that illustrates different pixel groups of an image sensor receiving image light through lenses and filters and generating a light-enhanced, after capture focused image, in accordance with an embodiment of the disclosure. FIG. 14 shows first pixel group 1020, second pixel group 1030, third pixel group 1040, and fourth pixel group 1050 receiving image light 503. First pixel group 1020 receives image light 503 through first lens 1260 and color filter 1360. Second pixel group 1030 receives image light 503 through second lens 1270 and black and white filter 1370. Third pixel group 1040 receives image light 503 through third lens 1280 and black and color filter 1360. Fourth pixel group 1050 receives image light 503 through fourth lens 1290 and black and white filter 1370.

First lens 1260 and second lens 1270 are configured to focus image light 503 from a same distance (e.g. essentially infinity) on first pixel group 1020 and second pixel group 1020. In one embodiment, first lens 1260 and second lens 1270 are combined into one lens. Third lens 1280 and fourth lens 1290 are configured to focus image light 503 from a same distance (e.g. 10 meters) on third pixel group 1040 and fourth pixel group 1050. In one embodiment, third lens 1280 and fourth lens 1290 are combined into one lens.

A shutter controller, such as shutter controller 405, may initiate image capture signals that expose each of the pixel groups (contemporaneously) for a same duration, generating first image 1422, second image 1432, third image 1442, and fourth image 1452. Light-enhanced/ACF logic 1490 receives first image 1422, second image 1432, third image 1442, and fourth image 1452 from first pixel group 1020, second pixel group 1030, third pixel group 1040, and fourth pixel group 1050, respectively.

Light-enhanced/ACF logic 1490 is coupled to output a light-enhanced/ACF image 1495. Light-enhanced/ACF logic may receive first image 1422 and second image 1432 and combine the pixel data to generate a first light-enhanced image. Light-enhanced/ACF logic may receive third image 1442 and fourth image 1452 and combine the pixel data to generate a second light-enhanced image. The first light-enhance image may be focused at a first distance (e.g. essentially infinity) from image sensor 1001. The second light-enhanced image may be focused at a second distance (e.g. 10 meters) from image sensor 1001. Light-enhanced/ACF logic 1490 may then perform an ACF algorithm (as described above) on the first light-enhanced image and the second light-enhanced image to generate light-enhanced/ACF image 1495.

Referring back to FIG. 3, it may be advantageous to utilize at least one flexible Printed Circuit Board ("PCB") to build the embodiments described in FIGS. 4-14. In one embodiment, image processing logic 490 (or logic 590, 690, 790, 890, 990, 1190, 1290, or 1490) and/or shutter controller 405 are disposed in left temple arm 330 or right temple arm 340. A flexible PCB (a.k.a. PCB flex) may carry image capture signals, data, and clock signals to any of the image sensors (and their respective pixel groups) described in this disclosure. The shutter control circuitry, image processing logic and image sensor(s) may be assembled on the same flexible PCB. Using a flexible PCB may be advantageous because it may allow hinging of left temple arm 330 or right temple arm 340 while still maintaining connections to electronics disposed in the temple arms. In one embodiment, the flexible PCB is partially (or fully) embedded in the frame of wearable glasses 300. Using flexible PCB may be advantageous because it may allow greater design liberties (e.g. to have a curved frame) in creating wearable glasses 300. If more than one sensor is disposed in wearable glasses 300, each of the sensors may be disposed on the same flexible PCB.

The processes or methods explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging device comprising:
a first pixel array arranged to capture a first image;
a second pixel array arranged to capture a second image;
a third pixel array arranged to capture a third image;
a fourth pixel array arranged to capture a fourth image, wherein the first, second, third, and fourth pixel array are facing the same direction;
a filter system that includes a color filter corresponding to the first pixel array and a color filter corresponding to the third pixel array, wherein the first and third pixel array receive image light through a respective color filter, and wherein the second and fourth pixel array do not receive image light through any color filter;
a lens system configured to focus image light onto the first pixel array and the second pixel array from a same first focus distance and configured to focus the image light onto the third pixel array and the fourth pixel array from a same second focus distance different from the first focus distance;
shutter control circuitry coupled to the first pixel array to initiate a first exposure period of the first pixel array to capture the first image and coupled to the second pixel array to initiate a second exposure period of the second pixel array to capture the second image, and wherein the shutter control circuitry is coupled to initiate a third exposure period of the third pixel array to capture the third image and coupled to initiate a fourth exposure period of the fourth pixel array to capture the fourth image; and
an image processor and memory for receiving first pixel data of the first image, second pixel data of the second image, third pixel data of the third image, and fourth pixel data of the fourth image, wherein the image processor is configured to generate at least one image using the first pixel data, the second pixel data, the third pixel data, and the fourth pixel data.

2. The imaging device of claim 1, wherein the first exposure period is for a first duration that is shorter than a second duration of the second exposure period.

3. The imaging device of claim 2, wherein the image processor is coupled to generate a composite image by combining the first pixel data and the second pixel data.

4. The imaging device of claim 3, wherein the image processor is configured to execute a high dynamic range (HDR) algorithm to combine the first pixel data and the second pixel data into the composite image.

5. The imaging device of claim 1, wherein the shutter control circuitry is configured to initiate the second exposure period after the first exposure period starts.

6. The imaging device of claim 1 further comprising a head mounted display (HMD), wherein the first pixel array, the second pixel array, the third pixel array, the fourth pixel array, the shutter control circuitry, and the image processor and memory are disposed on the HMD, and a flexible Printed Circuit Board (PCB) embedded in a frame of the HMD carries the first pixel data, the second pixel data, the third pixel data, and fourth pixel data to the image processor.

7. The imaging device of claim 1, wherein the at least one image is a light-enhanced and after capture focused image, the image processor configured to generate a first light-enhanced image based on the first and second pixel data and configured to generate a second light-enhanced image based on the third and fourth pixel data, the light-enhanced and after capture focused image being generated using the first light-enhanced image and the second light-enhanced image.

8. A method comprising:
initiating a first exposure period of a first pixel array to capture a first image;
initiating a second exposure period of a second pixel array to capture a second image wherein the first and second pixel arrays receive image light focused at a first optical power;
initiating a third exposure period of a third pixel array to capture a third image;
initiating a fourth exposure period of a fourth pixel array to capture a fourth image, wherein the third and fourth pixel arrays receive image light focused at a second optical power different than the first optical power, and wherein the first, second, third, and fourth pixel arrays are facing the same direction, and further wherein the first and third pixel arrays receive the image light through at least one color filter of a filter system, the second and fourth pixel arrays not receiving the image light through any color filter;
generating a first light-enhanced image based on first pixel data from the first image and second pixel data from the second image;
generating a second light-enhanced image based on third pixel data from the third image and fourth pixel data from the fourth image; and
generating an after capture focused (ACF) image based on the first and second light-enhanced images.

9. An imaging device comprising:
a first pixel array arranged to capture a first image; a second pixel array arranged to capture a second image; a third pixel array arranged to capture a third image;
a fourth pixel array arranged to capture a fourth image, wherein the first, second, third, and fourth pixel array are facing the same direction;
a filter system that includes a color filter corresponding to the first pixel array and a color filter corresponding to the third pixel array, wherein the first and third pixel array receive image light through a respective color filter, and wherein the second and fourth pixel array do not receive image light through any color filter;
a lens system configured to focus image light onto the first pixel array and the second pixel array at a first optical power and configured to focus the image light onto the third pixel array and the fourth pixel array at a second optical power different from the first optical power;
shutter control circuitry coupled to the first pixel array to initiate a first exposure period of the first pixel array to capture the first image and coupled to the second pixel array to initiate a second exposure period of the second pixel array to capture the second image, and wherein the shutter control circuitry is coupled to initiate a third exposure period of the third pixel array to capture the third image and coupled to initiate a fourth exposure period of the fourth pixel array to capture the fourth image; and
an image processor and memory for receiving first pixel data of the first image, second pixel data of the second image, third pixel data of the third image, and fourth pixel data of the fourth image, wherein the image processor is configured to generate a first light-enhance image using the first and second pixel data and configured to generate a second light-enhanced image using the third and fourth pixel data, the image processor further coupled to output an After Capture Focused (ACF) image using the first and second light-enhanced images.

* * * * *